(12) United States Patent
Muehlenthaler

(10) Patent No.: US 10,188,089 B2
(45) Date of Patent: Jan. 29, 2019

(54) DEVICE FOR REMOVING A FISH FROM A LINE

(71) Applicant: Keith Muehlenthaler, Alleman, IA (US)

(72) Inventor: Keith Muehlenthaler, Alleman, IA (US)

( * ) Notice: Subject to any disclaimer, the term of this patent is extended or adjusted under 35 U.S.C. 154(b) by 181 days.

(21) Appl. No.: 15/342,289

(22) Filed: Nov. 3, 2016

(65) Prior Publication Data

US 2017/0118970 A1  May 4, 2017

Related U.S. Application Data

(60) Provisional application No. 62/250,281, filed on Nov. 3, 2015.

(51) Int. Cl.
*A01K 97/00* (2006.01)
*A01K 97/18* (2006.01)
*A01K 99/00* (2006.01)

(52) U.S. Cl.
CPC .............. *A01K 97/18* (2013.01); *A01K 99/00* (2013.01)

(58) Field of Classification Search
CPC ..................................................... A01K 97/18
USPC ......................................................... 43/53.5
See application file for complete search history.

(56) References Cited

U.S. PATENT DOCUMENTS

| | | | | |
|---|---|---|---|---|
| 2,441,458 A * | 5/1948 | Underwood | .......... | A01K 97/18 43/53.5 |
| 2,662,331 A * | 12/1953 | Borup | .......... | A01K 97/18 43/53.5 |
| 2,861,383 A * | 11/1958 | Harvey | .......... | A01K 97/18 43/43.16 |
| 2,998,670 A * | 9/1961 | Edwards | .......... | A01K 97/18 43/53.5 |
| D199,737 S * | 12/1964 | Cross, Jr. | .......... | 43/53.5 |
| 3,721,034 A * | 3/1973 | Collins | .......... | A01K 97/18 43/53.5 |
| 4,045,904 A * | 9/1977 | Lore | .......... | A01K 97/18 43/53.5 |
| 4,342,171 A * | 8/1982 | Cripps | .......... | A01K 97/18 43/53.5 |
| 6,397,513 B1 * | 6/2002 | Reed | .......... | A01K 97/18 224/251 |
| 7,818,914 B1 * | 10/2010 | Baiamonte | .......... | A01K 97/18 43/53.5 |

* cited by examiner

*Primary Examiner* — Richard T Price, Jr.
(74) *Attorney, Agent, or Firm* — Zarley Law Firm, P.L.C.

(57) ABSTRACT

The present invention relates to a device for removing a fish from a line. The fish removing device has a generally U-shaped portion that extends into an elongated straight section. The straight section bends into a gripping section, which in one embodiment includes a first and second gripping member. After a fish is caught with a hook on a fishing line, the fishing line is caught in the U-shaped portion and slid down to the hook. The fishing line is then positioned horizontally between a first hand and the fish removing device held in a second hand. The fish is rotated on the fishing line, which applies rotational and gravitational force to the fish thereby dislodging the hook from the fish without having the user coming into physical contact with the fish.

20 Claims, 4 Drawing Sheets

DEVICE FOR REMOVING A FISH FROM A LINE

CROSS REFERENCE TO RELATED APPLICATION

This application claims the benefit of U.S. Provisional Application No. 62/250,281 filed Nov. 3, 2015.

BACKGROUND OF THE INVENTION

This invention is directed to a device for removing a fish from a hook or lure and more particularly a device for removing a fish from a hook or lure without physically touching the fish.

Fishing is a well-known and popular leisure activity. Typically, one uses a rod and a reel having a fishing line attached to the reel at one end, extending along the rod through eyelets and attached to a hook or lure at the opposite end. The hook or lure is cast into a body of water to attract a fish. When a fish bites the hook or lure, the hook penetrates the fish's mouth and the fish is reeled in. To remove the fish from the hook, one grabs the fish with one hand and the hook with the other hand and removes the hook from the fish's mouth.

While not difficult, there are some who do not like to touch the fish either because the fish is still alive or because of the slimy surface of the fish. Also, some fish, like Bullheads, have fins that can poke through skin. Therefore, there is a need in the art for a device that addresses this deficiency.

Thus it is a primary objective of this invention to provide a device for removing a fish from a line that improves upon the art.

Another objective of this invention is to provide a device for removing a fish from a line that is easy to use.

Yet another objective of this invention is to provide a device for removing a fish from a line that is low cost to make.

Another objective of this invention is to provide a device for removing a fish from a line that has limited parts.

These and other objectives, features, and advantages of the invention will become apparent from the specification and claims.

SUMMARY OF THE INVENTION

Figure 1:
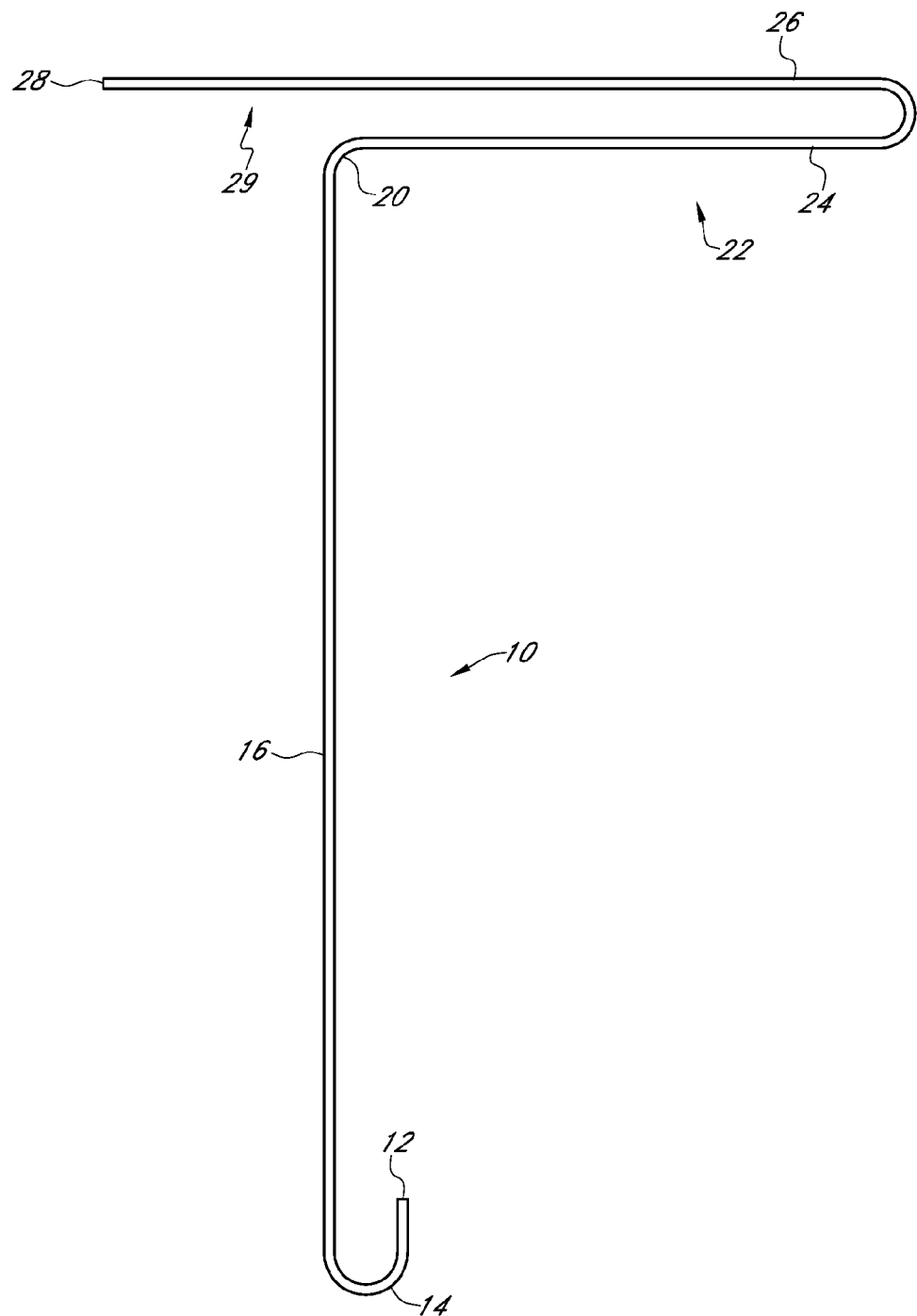
FIG. 1 is a perspective view of a device for removing a fish from a line.
Figure 2:
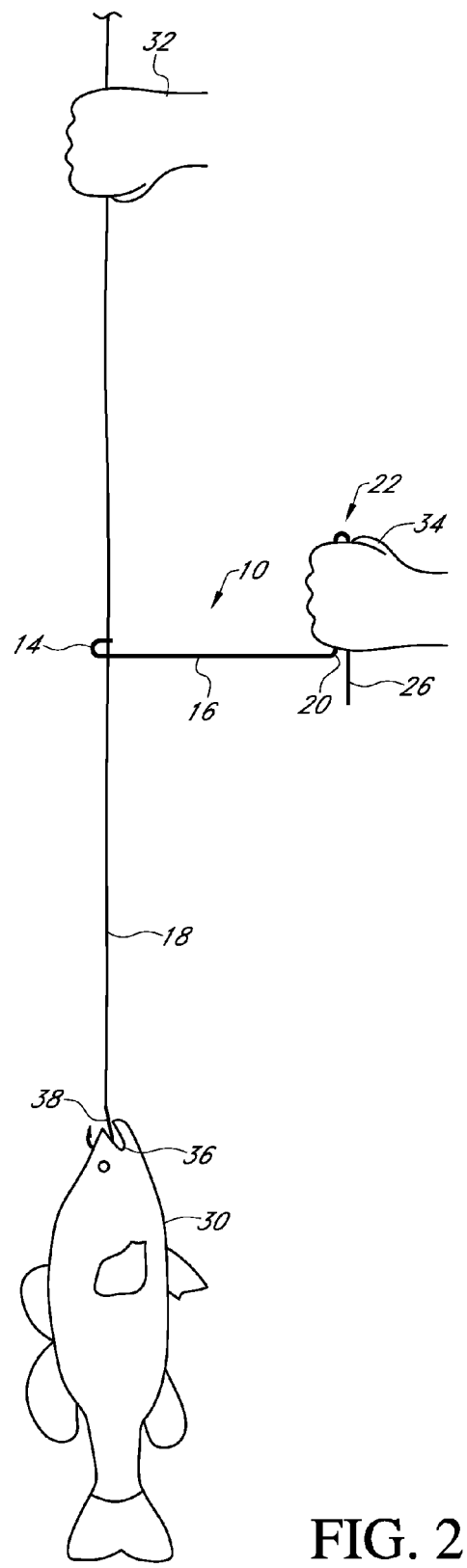
FIG. 2 is a perspective view of a device for removing a fish from a line.
Figure 3:
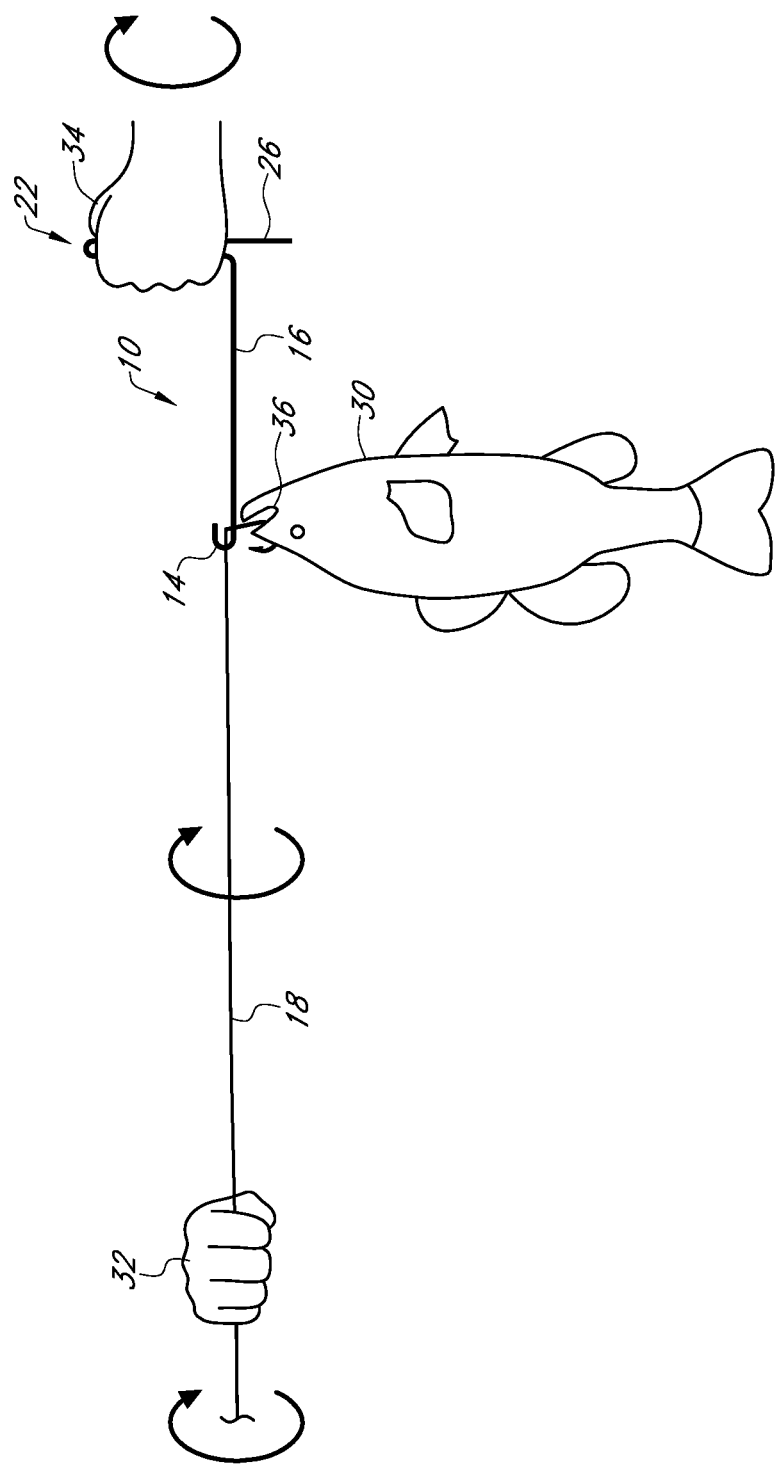
FIG. 3 is a perspective view of a device for removing a fish from a line.
Figure 4:
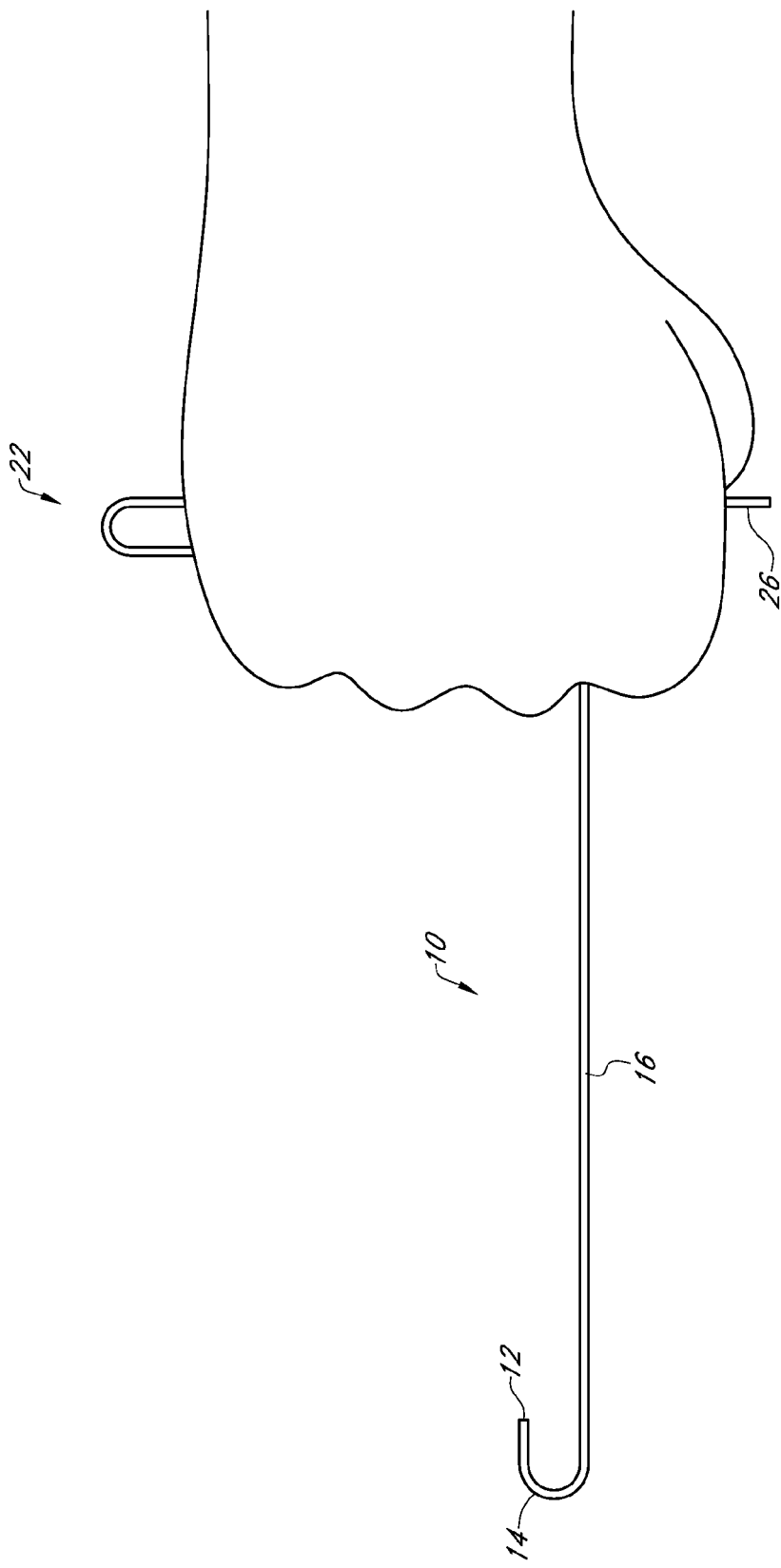
FIG. 4. is a perspective view of a device for removing a fish from a line.

In general, the present invention relates to a device for removing a fish from a line. The fish removing device has a generally U-shaped portion that extends into an elongated straight section. The straight section bends into a gripping section, which in one embodiment includes a first and second gripping member. After a fish is caught with a hook on a fishing line, the fishing line is caught in the U-shaped portion and slid down to the hook. The fishing line is then positioned horizontally between a first hand and the fish removing device held in a second hand. The fish is rotated on the fishing line, which applies rotational and gravitational force to the fish thereby dislodging the hook from the fish without having the user coming into physical contact with the fish.

DETAILED DESCRIPTION

Referring to the figures, the fish removing device 10 has a first end 12 that bends back to form a U-shaped or generally U-shaped portion 14. The U-shaped portion 14 in one embodiment extends less than 1.0 inch across and 1.0 in depth and in another embodiment extends less than 0.5 inches across and 0.5 inches in depth. In these measurements, a limited amount of material is needed. Also, the limited size of the U-shaped portion 14 is necessary for proper removal, although other sizes of U-shaped portions are contemplated.

From the generally U-shaped portion 14, the fish removing device 10 extends longitudinally through a straight section 16. In this manner, the first end 12 terminates in the same direction that the straight section 16 extends. In one example of the present invention, the straight section 16 extends approximately 6.0 inches, such that the straight section can easily engage a fishing line 18 and direct it towards the U-shaped portion 14 during operation. In other embodiments the length is longer or shorter.

The straight section 16 terminates at a bend 20 where the fish removing device 10 extends transversely into a gripping section or handle 22. In the illustrative embodiment, the bend 20 is generally perpendicular and extends in the same direction as the U-shaped member 14. In this arrangement, the handle 22 extends in the same direction as the first end 12 in relation to the straight section 16. In other embodiments, the straight section 16 terminates at the gripping section 22 directly.

In one example of the present invention, the gripping section 22 is U-shaped or generally U-shaped with a first gripping member 24 and second gripping member 26. In this arrangement, the second gripping member 26 terminates in a second end 28 and the second gripping member 26 in some embodiments is compressible towards the first gripping member 24.

In the illustrative embodiment shown, the gripping section 22 has a lower gripping portion 29 that extends past the straight section 16 in the opposite direction as the rest of the gripping section 22. In one arrangement, only the second gripping member 26 encompasses the lower gripping portion 29. The lower gripping portion 29 provides alternative methods of gripping the fish removing device 10.

The fish removing device 10 in one embodiment is made of any suitable metal, plastic, or other material that is durable and water resistant. In one embodiment, the fish removing device 10 is material constructed from a single continuous uniform body to provide the unique benefit of reducing costs while reducing costs associated with assembly.

In operation, after a fish 30 has been caught, one grasps the fishing line 26 with a first hand 32, such that the fishing line 18 and the attached fish 30 hang generally vertically. Holding the gripping section 22 with a second hand 34, the fishing line 18 is captured within U-shaped portion 14. In one particular operation, the user grips the gripping section 22 such that one or more finger engages the lower gripping section 29 along with the rest of the gripping section 22.

In one operation of the present invention, the fishing line 18 is captured by first engaging the fishing line 18 against the straight section 16 and running the fishing line 18 along the straight section toward the U-shaped portion 14 until the fishing line 18 is captured. Once the fishing line 18 is captured, the U-shaped portion 14 is then slid down the fishing line 18 until the U-shaped portion 14 reaches a mouth 36 of the fish 30. The fish removing device 10, held in the second hand 34, and the fishing line 18, held in the first hand 32, are then repositioned so that the fishing line 18 is generally horizontal and the fish 30 hangs vertically from U-shaped portion 14. In this position, the fish removing device 10 is positioned between the first hand 32 and a hook or lure 38 caught in the mouth 36 of the fish 30.

Finally, a circular motion or rotation up and away from the user is made with both the first hand 32 and the second hand 34. During the circular motion, the fish 30 initially moves upwards and towards the user and then away and downwards as the fish 30 flips over the fishing line 26. During the circular motion, rotational and gravitational force is applied to the fish 30, which along with the arrangement of the first hand 32 and the fish removing device 10, pulls a hook or lure 38, held in place by the U-shaped portion 14, away from the fish 30 dislodging the hook or lure 38 from the fish 30. In this rotational manner, as the hook or lure 38 is dislodged, the fish 30 is rotating downwards and away from the user, which limits the contact the user has with the fish 30 and also enables the fish 30 to be dislodged directly into a container (not shown) or other desired location. In contrast, if the rotation is reversed, the fish 30 is rotating at the user when it becomes dislodged.

Therefore, a device for removing fish from a line has been provided that is easy to use, is low cost to make, has limited parts, and improves upon the art.

From the above discussion and accompanying figures and claims it will be appreciated that the device for removing fish from a line offers many advantages over the prior art. It will be appreciated further by those skilled in the art that other various modification could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A fish removing device, comprising:
   a first end bending back into a U shaped end configured to engage a fishing line;
   the U shaped end extending into a straight section; and
   a gripping section connected to the straight section.

2. The fish removing device of claim 1 wherein the U-shaped end is approximately 1.0 inch or less across and approximately 1.0 inch or less in depth.

3. The fish removing device of claim 1 wherein the U-shaped end is approximately 6.0 inches in length.

4. The fish removing device of claim 1 wherein the first end terminates in the same direction that the straight section extends.

5. The fish removing device of claim 1 further comprising the gripping section extending transversely from the straight section at a bend.

6. The fish removing device of claim 5 wherein the bend is generally perpendicular and extends in the same direction as the U-shaped member.

7. The fish removing device of claim 1 further comprising the gripping section having a general U-shape.

8. The fish removing device of claim 1 further comprising the gripping section having a first gripping member and a second gripping member.

9. The fish removing device of claim 8 wherein the second gripping member terminates in a second end, such that the second gripping member is compressible towards the first gripping member.

10. The fish removing device of claim 1 further comprising the gripping section having a lower gripping portion that extends past the straight section in the opposite direction as the rest of the gripping section.

11. The fish removing device of claim 10 further comprising the gripping section having a first gripping member and a second gripping member, wherein only the second gripping member extends into the lower gripping portion.

12. The fish removing device of claim 1 wherein the U-shaped end, the straight section, and the gripping section are constructed of a single continuous uniform body.

13. A method of removing a fish from a line, comprising the steps of:
    providing a fish removing device having a generally U-shaped portion extending into a straight section connected to a gripping section;
    hanging a fishing line and a fish attached to the fishing line with a first hand;
    holding the fish removing device in a second hand;
    catching the fishing line in the U-shaped portion of the fish removing device;
    repositioning the fishing line such that the fishing line is generally horizontal and the fish hangs generally vertically from the U-shaped portion; and
    rotating the fish, such that a hook is removed from the fish.

14. The method of claim 13 wherein the step of rotating is completed by rotating the first hand and the second hand.

15. The method of claim 14 wherein the first hand and second had are rotated circularly up and away in relation a user, such that the fish flips over the fishing line.

16. The method of claim 13 includes applying rotational and gravitational force to the fish, such that the fish is pulled away from the hook.

17. The method of claim 13 wherein during the step of rotating the fish, the U-shaped portion holds the hook in place.

18. The method of claim 13 wherein when the fishing line is repositioned to a generally horizontal orientation, the fish removing device is positioned between the first hand and the hook caught in the generally vertically hanging fish.

19. The method of claim 13 further comprising the hook having a lure.

20. A fish removing device, comprising:
    a first end bending back into a generally U-shaped end;
    the generally U-shaped end extending into a straight section, wherein the generally U-shaped portion and the straight section are configured such that a fishing line is ran along the straight section towards the generally U-shaped section and is captured in the U-shaped portion such that a fish can be removed from a hook by rotating the fish; and
    a gripping section connected to the straight section.

* * * * *